US 6,729,894 B2

(12) United States Patent
Ooya et al.

(10) Patent No.: US 6,729,894 B2
(45) Date of Patent: May 4, 2004

(54) CARD CONNECTOR

(75) Inventors: Masaaki Ooya, Yokohama (JP); Kiyoshi Abe, Tokyo (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 9 days.

(21) Appl. No.: 10/260,274

(22) Filed: Oct. 1, 2002

(65) Prior Publication Data

US 2003/0068911 A1 Apr. 10, 2003

(30) Foreign Application Priority Data

Oct. 4, 2001 (JP) ........................ 2001-308828

(51) Int. Cl.[7] .............................................. H01R 13/62
(52) U.S. Cl. ...................................................... 439/159
(58) Field of Search .................. 439/159, 160

(56) References Cited

U.S. PATENT DOCUMENTS

| 4,795,897 | A | * | 1/1989 | Chalendard | 235/482 |
| 6,059,588 | A | * | 5/2000 | Tung et al. | 439/159 |
| 6,382,995 | B1 | * | 5/2002 | Bricaud et al. | 439/159 |
| 6,394,827 | B2 | * | 5/2002 | Nogami | 439/159 |
| 6,537,090 | B2 | * | 3/2003 | Ozawa | 439/159 |

FOREIGN PATENT DOCUMENTS

| JP | 2000-251024 | 9/2000 |
| JP | 2000-251025 | 9/2000 |

* cited by examiner

Primary Examiner—Neil Abrams
Assistant Examiner—Phuong Dinh
(74) Attorney, Agent, or Firm—Finnegan, Henderson, Farabow, Garrett & Dunner, LLP (57) ABSTRACT

One end of the coil spring is held by the support pin of the ejecting member, and the other end of the coil spring is held by the inner surface of the spring seat portion of the metallic cover member.

6 Claims, 6 Drawing Sheets

CARD CONNECTOR

This application is based on Patent Application No. 2001-308828 filed Oct. 4, 2001 in Japan, the content of which is incorporated hereinto by reference.

BACKGROUND OF THE INVENTION

1. Field of the Invention

The present invention relates to a card connector provided with an ejecting mechanism capable of selectively ejecting a card mounted thereon.

2. Description of the Related Art

Various functions of electronic equipments such as a cellular phone, telephone, PDA (personal digital assistant) or camera have been extended by mounting thereon, via a card connector of the respective equipment, an IC card in which a central processing unit (CPU) or an IC for memory is incorporated, such as a SIM (subscriber identity module) card, an MMC (MULTI-MEDIA CARD; trade mark) or an SD (secure digital) card; a MEMORY STICK (trade mark); or a SMART MEDIA (trade mark).

The card connector for detachably mounting such an IC card thereto comprises a base member having a plurality of contact terminals to be electrically connected to electrode pads in the IC card for selectively accommodating the IC card, an ejecting mechanism provided at the base member for selectively ejecting the IC card accommodating within the base member outward, and a cover member for covering the base member and the ejecting mechanism, as disclosed in Japanese Patent Application Laid-open Nos. 2000-251025 and 2000-251024.

A chamber for accommodating the IC card is defined by combining the base member with the cover member. The base member is formed, for example, of resinous material and the cover member is formed of metallic material.

The ejecting mechanism comprises, for example, an ejector for selectively guiding the mounted IC card toward an open end or the chamber of the card connector, and a cam mechanism for locking or unlocking the ejector relative to the card chamber.

The cam mechanism mainly comprises as an element, for example, a coil spring for biasing the ejector toward the open end of the card connector, a cam portion in which a guide groove is formed and a cam follower member (a rocking arm) movably engaging at the other end thereof with the guide groove.

One end of the coil spring is engaged with the ejector, while the other end of the coil spring is brought into contact with the inner surface of an end of the base member.

When the IC card is mounted to the chamber, the ejector of the ejecting mechanism is pressed by a front end of the IC card against the biasing force of the coil spring to engage one end of the rocking arm with a predetermined position of the guide groove and hold the same there, whereby the ejecting mechanism is maintained in the locked state to hold the IC card at the predetermined position.

Also, when the IC card is removed from the chamber, the IC card is again pushed in the same direction such that the one end of the rocking arm is disengaged from the predetermined position in the guide groove to release. Thus, the ejecting mechanism becomes in an unlocked state whereby the ejector is made to move toward the open end of the card connector by the biasing force of the coil spring. As a result, part of the IC card is pushed out from the chamber.

In the assembly of the above-mentioned ejecting mechanism, the coil spring is disposed between the above-mentioned ejector and the inner surface of the base member while being compressed by a predetermined amount from a free length thereof.

Thereafter, when a portion of the contact terminal in the completed card connector to be soldered is electrically bonded by reflow soldering (including lead-free solder such as tin-silver or tin-silver-copper; this is also true hereinafter) to an electrode of a substrate in an electronic equipment, there is a risk in that the base member molded with resin may become deformed under the influence of the heat during the soldering and the biasing force of the coil spring. While it would be thought to thicken the thickness of the base member as a countermeasure thereto, this is not advantageous because this is reverse to the requirement for thinning the card connector.

SUMMARY OF THE INVENTION

In view of such a problem, an object of the present invention is to provide a card connector having an ejecting mechanism for selectively discharging the mounted card, capable of avoiding the undesirable heat distortion of a base member even though a section of a contact terminal to be soldered is electrically bonded by the reflow soldering.

To achieve the above object, a card connector of the present invention comprises a base member having contact terminals to be electrically connected to electrodes of a card and a card accommodating chamber for selectively mounting the card, and an ejecting mechanism provided at the base member, the ejecting mechanism comprising an ejector disposed in the base member for selectively discharging the card and a biasing member for biasing the ejector; a cover member formed of heat-resistant material for covering the base member and the ejecting mechanism; wherein one end of the biasing member is engaged with the ejector and the other end of the biasing member is held by the cover member.

The biasing member may be held between the stopper member disposed on one side of the cover member for restricting a position of the ejector and the inner surface of the other end of the cover member via the ejector.

The base member may be formed of electrically insulating material and the cover member may be formed of metal sheet.

As apparent from the above description, according to the card connector of the present invention, since one end of the biasing member is engaged with the ejector and the other end of the biasing member is held by the cover member made of heat-resistant material and the cover member covering the ejecting mechanism and the base member, the biasing force is not applied to the base member. Accordingly, even if the portion of the contact terminal to be soldered is electrically connected to the electronic equipment by the reflow soldering, undesirable heat distortion is avoidable in the base member.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

Figure 2:
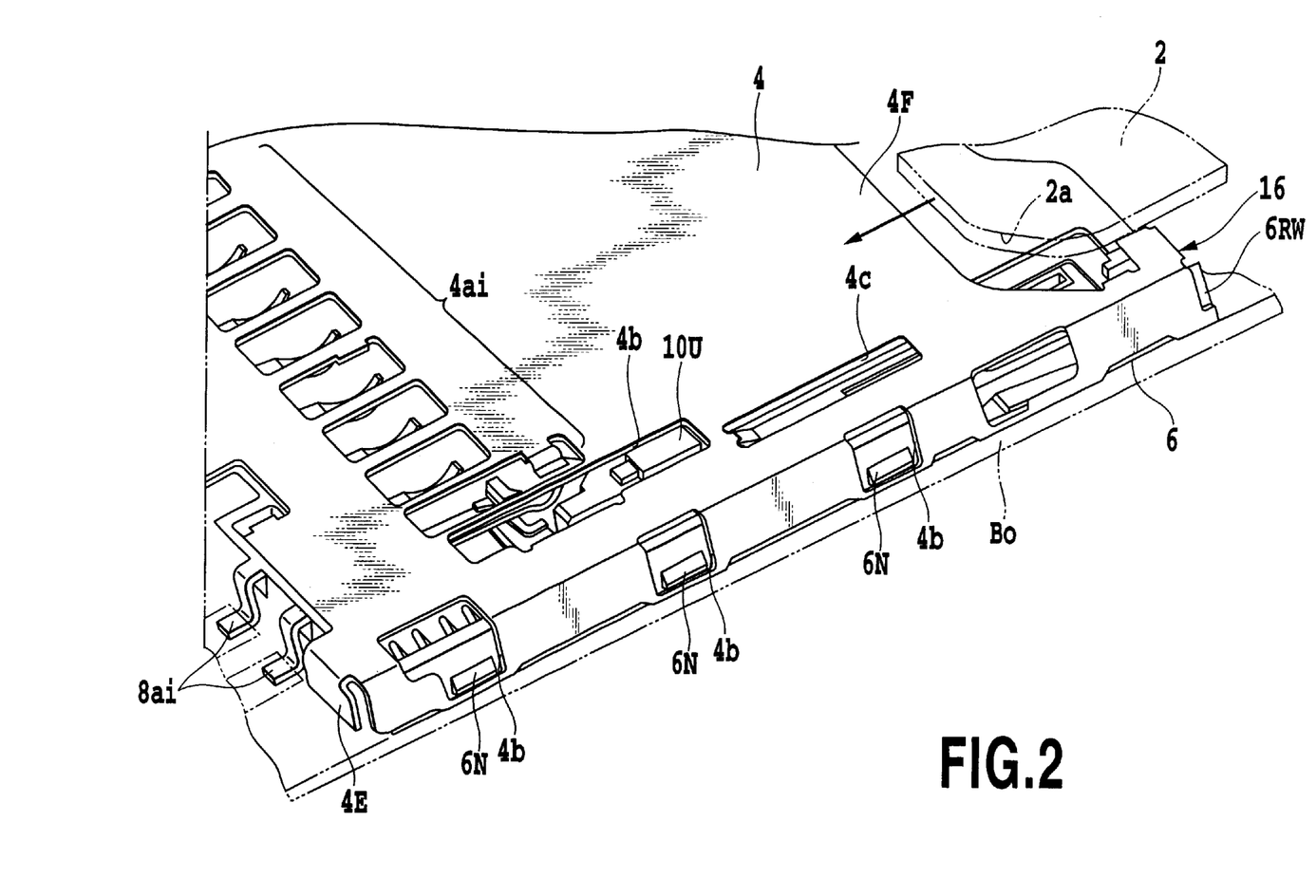
FIG. 2 is a perspective view of part of a card connector illustrating an appearance thereof together with an IC card according to the embodiment of the present invention.

FIG. 2 illustrates an appearance of a card connector according to an embodiment of the present invention.

In FIG. 2, the card connector mainly comprises as an element a base member 6 in which a plurality of contact terminals 8ai (i=1 to n; n is a positive integer) are arranged at one end thereof in the widthwise direction, for detachably accommodating an IC card 2; a cover member 4 covering all over the base member 6 to define an accommodating chamber 16 for the IC card 2; and an ejecting mechanism 14 (see FIG. 3) for selectively holding the IC card 2 to be mounted in the chamber 16 (in a locked state) or discharging the IC card 2 therefrom (in an unlocked state).

The IC card 2 is, for example, an SD (secure digital) card having a plurality of electrode pads in correspondence to card connecting portions of the respective contact terminals 8ai described later. Also, one edge of the IC card 2 has an inclined portion 2a at one corner.

The base member 6 is molded with, for example, electro-insulating resinous material, and disposed on a circuit board Bo within a predetermined electronic equipment in correspondence to the electrode section of the circuit board Bo.

Figure 3:
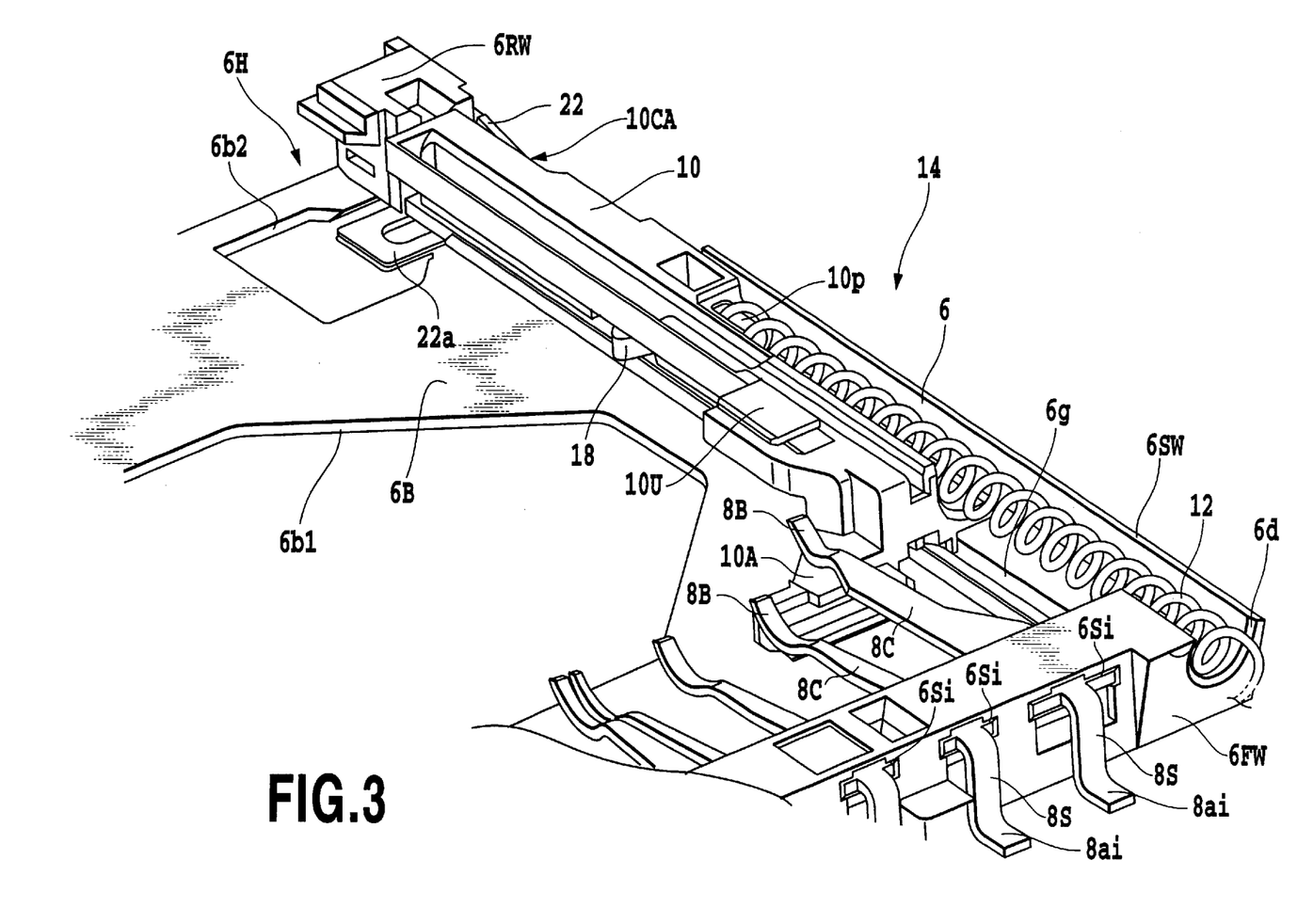
FIG. 3 is a perspective view showing a substantial part of the ejecting mechanism according to the embodiment shown in FIG. 2.

The base member 6, as shown in FIG. 3, is comprised of a underside 6B placed on the circuit board Bo having a relatively large opening 6b1, lateral walls 6SW for forming opposite sides of the underside 6B and a connecting wall 6FW for connecting one ends of both lateral walls 6SW and on which fixing portions of the above-mentioned contact terminals 8ai are arranged at a predetermined pitch.

In the connecting wall 6FW, elongate slits 6Si (i =1 to n; n is a positive integer) into which the fixing portions of the respective contact terminals 8ai are press-fit are arranged at a predetermined pitch in correspondence to that of the electrode pads of the IC card 2 in the arrangement direction of the contact terminals 8ai.

The contact terminal 8ai shaped like a metal sheet includes as shown in FIG. 3 solder terminal 8S soldering bonded to the electrode sections of the circuit board Bo, connecting terminal sections 8B to be electrically connected to the electric pads of the IC card 2, and elastic fixing sections 8C for connecting the solder terminal 8S to the connecting terminal sections 8B.

In a portion of the base member 6 opposed to the connecting wall 6FW, an opening 6H is formed for allowing the IC card 2 to pass therethrough when the IC card 2 is inserted in the direction of the arrow shown in FIG. 2, that is, the direction toward the inside of the chamber 16 or discharged from the chamber 16 reverse to the direction of the arrow. On the periphery of the opening 6H, a pair of columnar portions 6RW are opposed to each other as shown in FIG. 3.

On outer surfaces of both the lateral walls 6SW in the base member 6, as shown in FIG. 2, a plurality of lugs 6N to be engaged with engagement holes of the cover member 4 described later are formed at a predetermined pitch.

On inside of the one lateral wall 6SW in the base member 6, the ejecting mechanism 14 is disposed as shown in FIG. 3. The ejecting mechanism 14 includes an ejector member 10 movable relative to the base member 6 while being guided by a guide groove 68 formed in the base member 6 along the lateral wall 6SW, a coil spring 12 used as a elastic member arranged between the ejector member 10 and the cover 4 described later, for biasing the ejector member 10 toward the columnar portion 6RW, and a cam mechanism CM for selectively making the ejector member 10 to be in a locked state or in an unlocked state relative to the base member 6.

Figure 4:
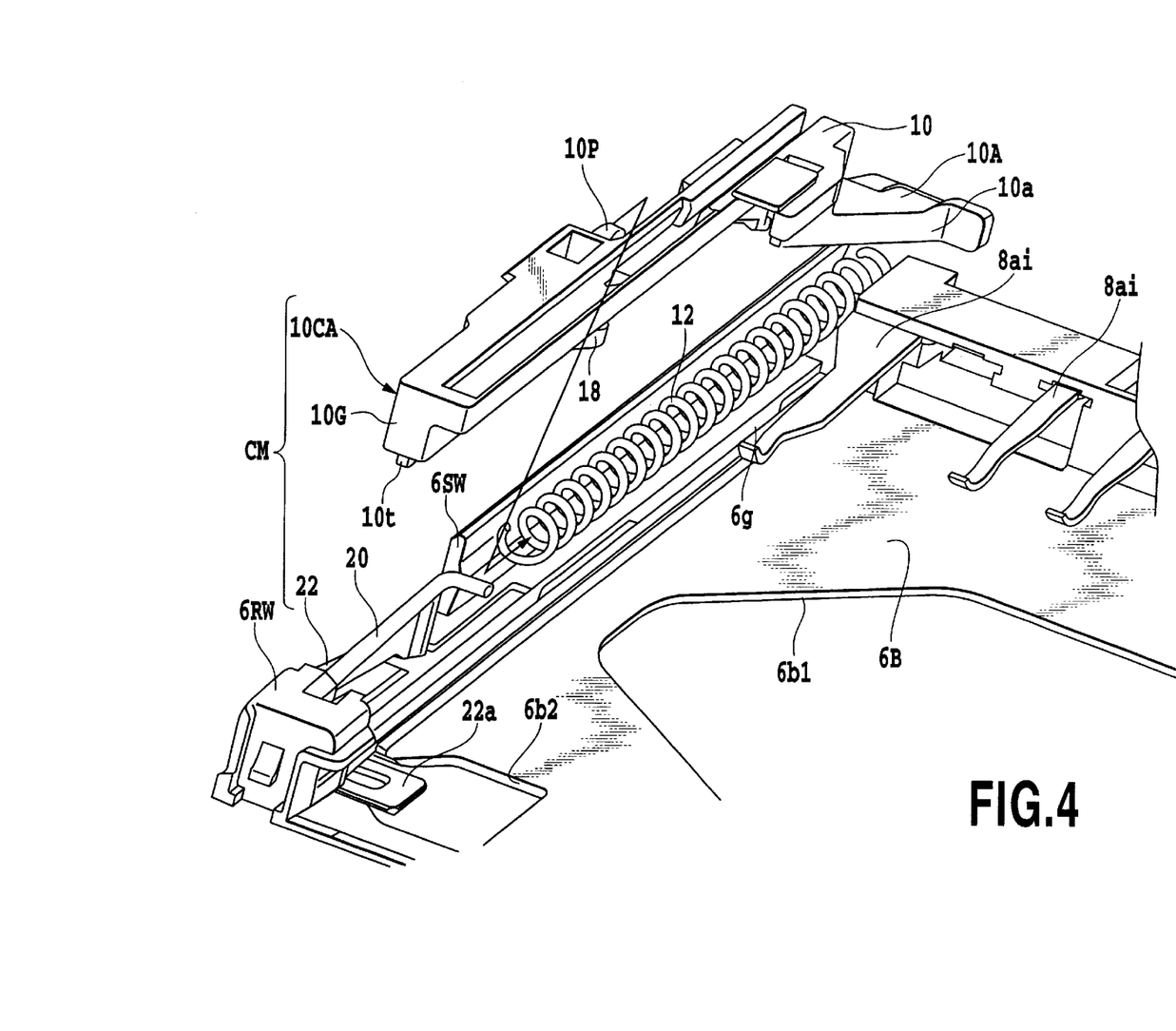
FIG. 4 is an exploded perspective view showing a substantial part of the ejecting mechanism according to the embodiment shown in FIG. 2.
Figure 5:
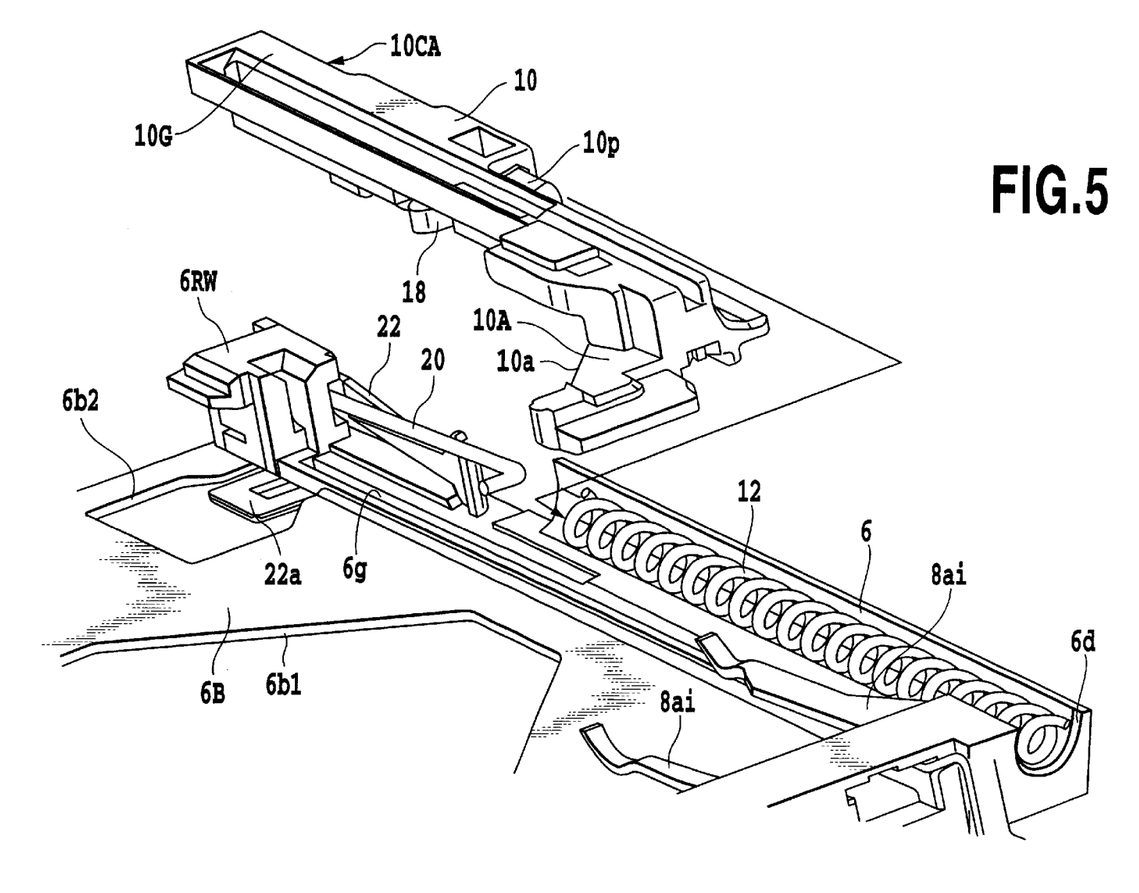
FIG. 5 is an exploded perspective view showing a substantial part of the ejecting mechanism according to the embodiment shown in FIG. 2.

For example, the molded-resinous material the ejector member 10 includes, as shown in FIG. 4, a guided portion 10G to be guided by a guide groove 6g, and a card receiving portion 10A formed at one end of the guided portion 10G, for receiving the inclined portion 2a of the mounted IC card 2 described above. The ejector member 10 is disposed inside the base member 6 on the guide groove 6g so that the card receiving portion 10A is opposed to the contact terminals 8ai as shown in FIG. 3.

The guided portion 10G has a protrusion 10t extended in the longitudinal direction on the bottom thereof to be engageable with the guide groove 6g. At the part of the guided portion 10G opposed to the lateral side of the inserted IC card 2 is provided a leaf spring 18 having a projection to be selectively inserted into a notch provided in the IC card 2 as shown in FIGS. 3 and 4. On the other hand, at a part of the guided portion 10G opposed to the lateral wall 6SW is provided a support pin 10P around which is wound one end of the coil spring 12. The other end of the coil spring 12 extends an arc 6d of the base member 6 toward the inner surface of the cover member 4 described later.

The card receiving portion 10A has a inclined surface 10a to which touches the inclined portion 2a of the IC card 2 inserted into the chamber 16.

The cam mechanism CM includes a cam element shaped like a generally heart-shape (a heart cam) formed on a cam surface 10CA contiguous to a region of the guided portion 10G of the ejector member 10 in which the support pin 10P is provided, a plurality of lever guide grooves formed on the cam surface 10CA at a predetermined height difference around the heart cam, a cam lever 20 of a stapler's needle shape(being shaped like a rectangle), one end of which is movablyheld by the columnar portion 6RW and the other end of which is slidable along the lever guide grooves, and a cam pressing member 22 for biasing a front end of the cam lever 20 to guide surfaces of the plurality of lever guide grooves.

At a proximal end of the cam pressing member 22, a tab 22a is provided for attaching the same to the circuit board Bo. A front end of the tab 22a projects into an opening 6b2 in the underside 6B smaller than the opening 6b1 in the underside 6B.

In this structure, after the front end of the IC card 2 has been inserted into the chamber 16 and engaged with the card receiving portion 10A of the ejector member 10, the ejector member 10 is pressed against the biasing force of the coil spring 12. Then, the other end of the cam lever 20 is engaged with a predetermined position of the lever guide groove and held there, whereby the cam mechanism CM brings the ejector member 10 into the locked state relative to the base member 6. Thereby, the IC card 2 is held in the chamber 16 and the electrode pad of the IC card 2 is electrically connected with the connector terminal 8B of the contact terminal 8ai.

On the other hand, when the IC card 2 is removed from the chamber 16, the IC card 2 loaded is pressed to be further slightly pushed into the latter. Hereby, the other end of the cam lever 20 is released, and the cam mechanism CM makes the ejector member 10 to be in the unlocked state relative to the base member 6. Accordingly, as shown in FIG. 3, the ejector member 10 is made to move toward the columnar portion 6RW due to the recovery force of the coil spring 12 and simultaneously therewith one end of the IC card 2 is discharged outward.

Figure 1:
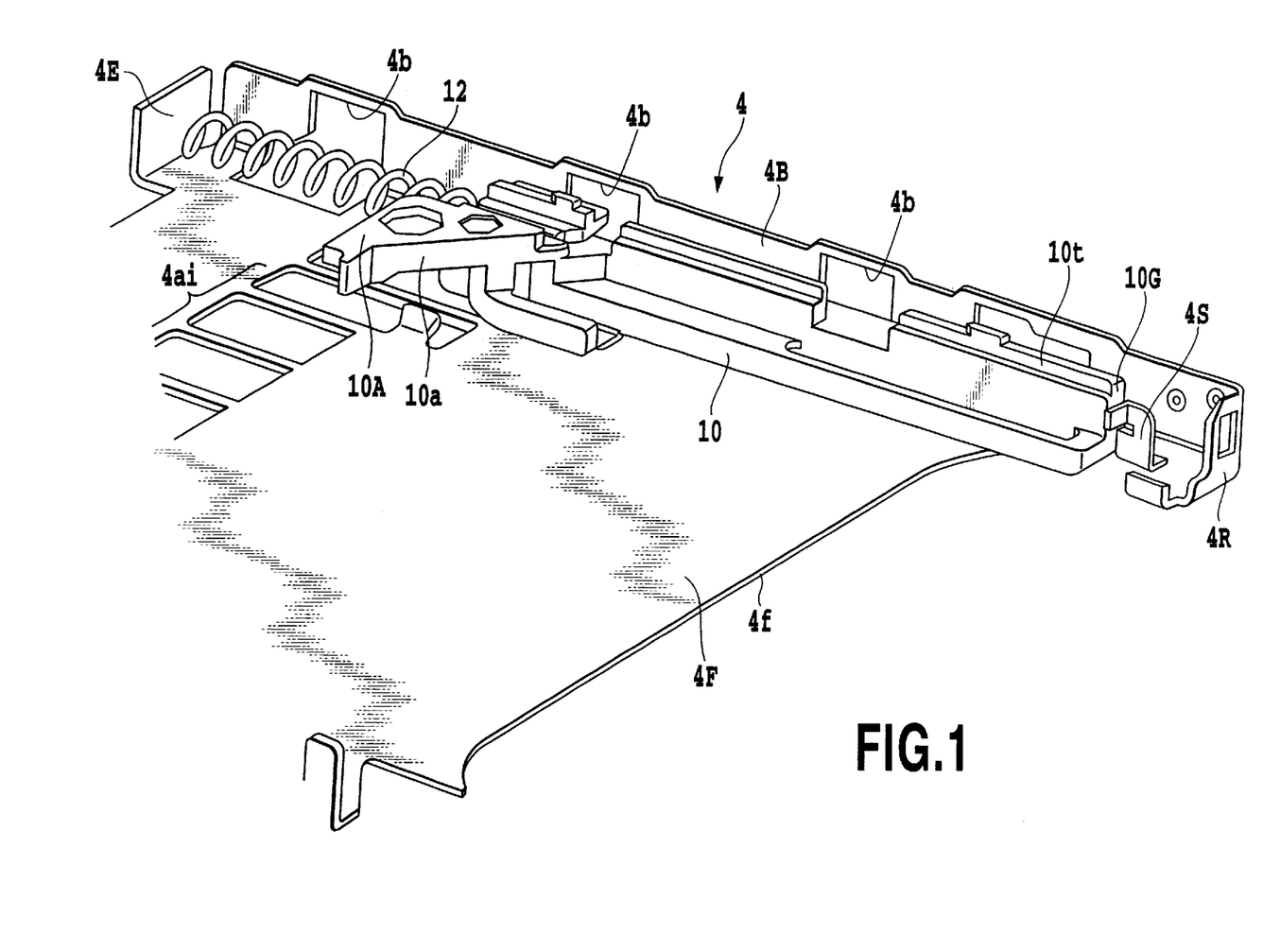
FIG. 1 is a perspective view showing a substantial part of an ejecting mechanism of a card connector together with a cover member according to one embodiment of the present invention.

As shown in FIGS. 1 and 2, the cover member 4 covering all over the base member 6 and forming the chamber 16 is formed, for example, of sheet metal. The cover member 4 having a rectangle-shaped cross-section includes a pair of bending sections 4B covering the respective lateral walls 6SW of the base member 6 and a flat surface section 4F connected to the each bending sections 4B for forming a top section of the chamber.

In the respective bending section 4B, engaging hole 4b are formed in correspondence to the respective lugs 6N of the base member 6. The lower end of the periphery of the respective engaging hole 4b is engaged with the respective lug 6N.

One end of the flat surface section 4F has a generally U-shaped recess 4f. At the respective end of the periphery of the recess 4f, a bending part 4R is formed for the engagement with the columnar portion 6RW. Further, in the vicinity of one of the bending parts 4R, a stopper member 4S is provided to be in contact with the end of the guided portion 10G of the ejector member 10 for restricting the initial position thereof. At the other end of the flat surface section 4F, a plurality of generally rectangular openings 4ai (i=1 to n; n is a positive integer) are formed parallel to each other while being opposed to the respective contact terminals 8ai provided on the base member 6. In the vicinity of the opening 4ai positioned at the end of the arrangement of the openings 4ai, elongated openings 4b are formed parallel to each other as shown in FIG. 2. In the opening 4b, the uppermost end 10U of the ejector member 10 is made to move. Between the opening 4b and the recess 4f, an opening 4c is formed.

Figure 6:
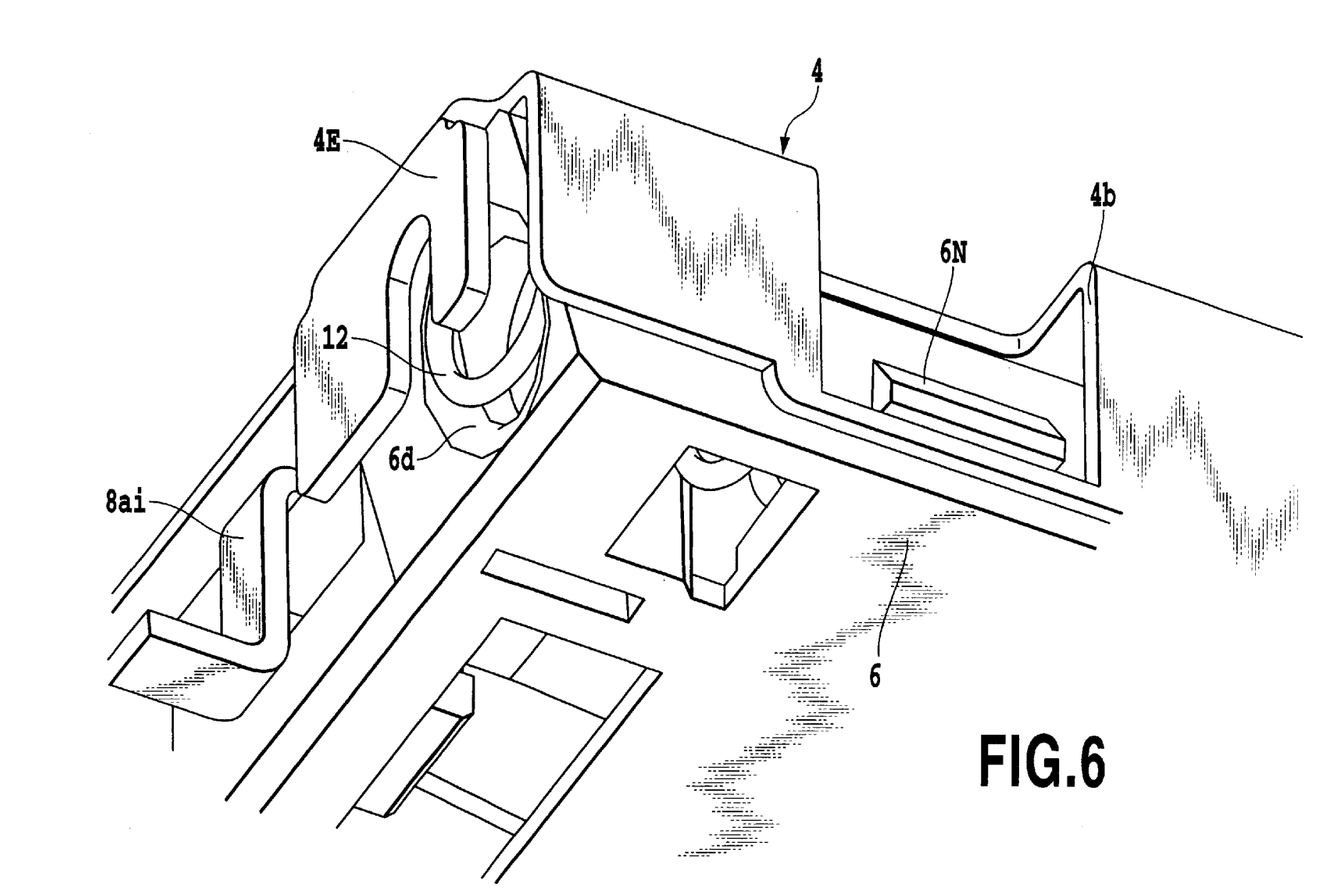
FIG. 6 is an enlarged perspective view of part of a card connector illustrating an appearance according to the embodiment of the present invention.

In addition, at the other end of the flat surface section 4F, a spring seat portion 4E is provided opposite to the bending part 4R as shown in FIG. 1. The above-mentioned spring seat portion 4E for receiving and supporting the other end of the coil spring 12 by the inner surface thereof is integrally formed with the flat surface section 4F by bending the latter. Accordingly, the one end of the coil spring 12 is held by the support pin 10P of the ejector member 10, and the other end of the coil spring 12 touches to the inner surface of the spring seat portion 4E as shown in FIG. 6 in an enlarged manner. As a result, when the IC card 2 is not mounted, the coil spring 12 is disposed between the ejector member 10 and the spring seat portion 4E while being contracted to a predetermined amount.

In such an structure, when the solder portion 8S of the respective contact terminal 8ai is bonded by the reflow-soldering, the biasing force of the coil spring 12 operates between the inner surface of the spring seat portion 4E of the cover member 4, the support pin 10P of the ejector member 10 and the stopper member 4S; that is, between inner surfaces of the spring seat portion 4E and the stopper member 4S in the cover member 4 via the ejector member 10, whereby the undesirable heat distortion of the base member 16 as in the case wherein the biasing force of the coil spring 12 is applied to the base member 16 is avoidable.

In this regard, while the coil spring 12 is used as an elastic member in the above embodiment, the present invention should not be limited thereto but other elastic members such as rubber may be used.

Also, in the above embodiment, while the present invention has been applied to a biasing member of a so-called heart cam type ejecting mechanism, it should not be limited thereto, but may be applicable to other types of ejecting mechanisms.

While the spring seat portion 4E is formed in integral with the cover member 4 in the above embodiment, it is unnecessary to form the both in an integral manner. For example, spring seat portion 4E having a heat-resistant prepared as a separate part may be, of course, fixed to the cover member 4.

The present invention has been described in detail with respect of the preferred embodiment, and it will now be apparent from foregoing to those skilled in the art that changes and modifications may be made without departing from the invention in its broader aspects, and it is the intention, therefore, in the appended claims to cover all such changes and modifications as fall within true spirit of the invention.

What is claimed is:

1. A card connector comprising:
   a base member having contact terminals to be electrically connected to electrodes of a card and a card accommodating chamber for selectively mounting the card;
   an ejecting mechanism provided at said base member, said ejecting mechanism comprising an ejector disposed in said base member for selectively discharging said card and a biasing member for biasing said ejector, said biasing member being held between a stopper member disposed on one side of said cover member for restricting a position of said ejector and the inner surface of the other end of said cover member via said ejector; and
   a cover member formed of heat-resistant material for covering said base member and said ejecting mechanism;
   wherein one end of said biasing member is engaged with said ejector and the other end of said biasing member touches to the inner surface of said cover member at the other end of the latter through an opening portion provided at edge of said base member.

2. A card connector as claimed in claim 1, wherein said base member is formed of electrically insulating material and said cover member is formed of metal sheet.

3. A card connector as claimed in claim 1, wherein said biasing member is an elastic member.

4. A card connector as claimed in claim 1, wherein said stopper member is disposed at a position in said cover member opposed to a card inserting opening of said card accommodating chamber.

5. A card connector as claimed in claim 1, wherein said biasing member is a coil spring for biasing said ejector toward said stopper member.

6. A card connector as claimed in claim 1, wherein the other end of said cover member constitutes a spring seat portion formed by bending part of said cover member and disposed opposite to said stopper member.

* * * * *

UNITED STATES PATENT AND TRADEMARK OFFICE
CERTIFICATE OF CORRECTION

| | | |
|---|---|---|
| PATENT NO. | : 6,729,894 B2 | Page 1 of 1 |
| APPLICATION NO. | : 10/260274 | |
| DATED | : May 4, 2004 | |
| INVENTOR(S) | : Masaaki Ooya et al. | |

It is certified that error appears in the above-identified patent and that said Letters Patent is hereby corrected as shown below:

On Title Page, Item (56), References Cited, add the following:

--5,969,331 A   -   10/1999      Hoolhorst et al. . . . . . . . . . 235/486--

On Title Page, Item (57), delete the Abstract in its entirety and insert therefore:

--A card connector comprising a base member, an ejecting mechanism, and a cover member is provided. The base member has contact terminals for electrical connection to electrodes of a card and a card accommodating chamber for mounting the card. The ejecting mechanism comprises an ejector disposed for discharging the card and a biasing member for biasing the ejector. The biasing member is held between a stopper member disposed on one side of the cover member for restricting a position of the ejector and the inner surface of the other end of the cover member via the ejector. One end of the biasing member is engaged with the ejector and the other end of the biasing member touches the inner surface of the cover member at the other end of the latter through an opening portion provided at edge of the base member.--

Signed and Sealed this

Sixth Day of March, 2007

JON W. DUDAS
*Director of the United States Patent and Trademark Office*